UNITED STATES PATENT OFFICE.

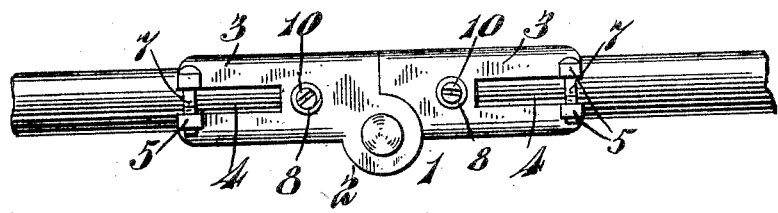
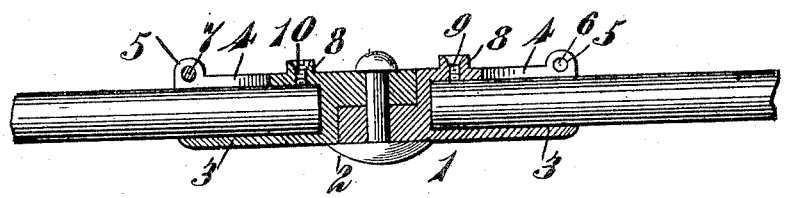
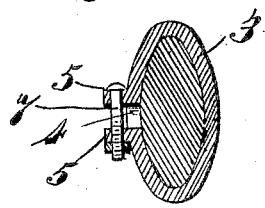

OTTO KIRCHNER, OF LAWRENCEBURG, INDIANA.

BRACE-JOINT FOR VEHICLE-TOPS.

No. 797,692.             Specification of Letters Patent.             Patented Aug. 22, 1905.

Application filed December 12, 1904. Serial No. 236,561.

*To all whom it may concern:*

Be it known that I, OTTO KIRCHNER, a citizen of the United States, residing at Lawrenceburg, in the county of Dearborn and State of Indiana, have invented certain new and useful Improvements in Brace-Joints for Vehicle-Tops; and I do declare the following to be a full, clear, and exact description of the invention, such as will enable others skilled in the art to which it appertains to make and use the same.

This invention relates to improvements in joints for vehicle-top braces.

The object of the invention is to provide a joint with which the ends of the braces of vehicle-tops may be quickly and easily attached and securely held.

A further object is to provide a joint of this character having sockets to receive the ends of the top-braces, the sockets being so formed as to permit them to yield to accommodate the ends of the braces, which may vary somewhat in size.

With these and other objects in view the invention consists of certain novel features of construction, combination, and arrangement of parts, as will be hereinafter described and claimed.

In the accompanying drawings, Figure 1 is a side view of the adjacent hinged ends of a vehicle-top brace, showing the application of the invention to the same. Fig. 2 is a horizontal sectional view of the same, and Fig. 3 is a transverse sectional view through one end of the joint.

Referring to the drawings more particularly, 1 denotes the joint, which consists of two members hinged together by means of a rule-joint 2. The outer portions of the joint members are in the form of sockets 3, which are preferably elliptical in cross-section. The socket portions of the joint members are provided on one side with a longitudinally-disposed slot 4, which permits the walls of the socket to yield and accommodate the ends of the brace-bars, which may vary somewhat in size.

On the outer ends of the socket portions 3 of the joint members, adjacent to the edges of the slot 4, are formed laterally-projecting lugs or ears 5, in which are formed alined apertures 6. One of said apertures is provided with threads to receive the threaded ends of clamping-bolts 7, which are passed through the apertures in the opposite lugs and are screwed into said threaded aperture, thereby clamping the slotted socket members into engagement with the inserted ends of the brace-bars.

On the outer side of the socket members, near the inner hinged ends of the same, are formed bosses 8, through which and the side of the socket are formed threaded apertures 9. Through these apertures are screwed set-screws 10, the inner ends of which impinge against the inner ends of the brace-bars, thereby securely holding said ends against withdrawal.

By constructing a brace-joint in the manner herein shown and described the ends of the brace-bars may be securely clamped and held in position, so that should the bars at either end of the brace become bent or broken the same may be readily removed and replaced.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

A top-brace joint for vehicles, consisting of two slotted socket members having a rule-joint connection, lugs formed on said socket members, one of each pair of said lugs having a threaded perforation therein, a clamping-screw engaging said lugs whereby the slotted ends of the socket members are clamped to the ends of the brace-bars, and a set-screw arranged in each of said socket members and adapted to be screwed into engagement with the inner ends of said bars whereby the same are firmly held in said sockets, substantially as described.

In testimony whereof I have hereunto set my hand in presence of two subscribing witnesses.

OTTO KIRCHNER.

Witnesses:
     OSCAR S. WOEBER,
     PETER HOFMANN.